United States Patent
Wenckel et al.

(10) Patent No.: US 8,973,721 B2
(45) Date of Patent: Mar. 10, 2015

(54) BRAKING APPARATUS

(71) Applicant: DOLMAR GmbH, Hamburg (DE)

(72) Inventors: Mathias Wenckel, Hamburg (DE); Carsten Ziegs, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 13/908,466

(22) Filed: Jun. 3, 2013

(65) Prior Publication Data
US 2013/0327600 A1 Dec. 12, 2013

Related U.S. Application Data

(62) Division of application No. 12/662,537, filed on Apr. 22, 2010, now Pat. No. 8,499,902.

(30) Foreign Application Priority Data

Apr. 23, 2009 (DE) .................... 20 2009 005 935 U (51) Int. Cl.
| | | |
|---|---|---|
| F16D 51/00 | (2006.01) | |
| F16D 55/02 | (2006.01) | |
| F16D 51/10 | (2006.01) | |
| F16D 127/00 | (2012.01) | |

(52) U.S. Cl.
CPC ............... *F16D 55/02* (2013.01); *F16D 51/10* (2013.01); *F16D 2127/002* (2013.01)
USPC ........................................... 188/74; 188/185

(58) Field of Classification Search
USPC .......................................... 188/187, 74, 185
See application file for complete search history.

(56) References Cited

U.S. PATENT DOCUMENTS

| | | | |
|---|---|---|---|
| 1,618,259 A | 2/1927 | Aldridge | |
| 1,904,089 A | 4/1933 | Schwerin | |
| 2,393,926 A | 1/1946 | Mulford | |
| 2,451,373 A | 10/1948 | Beall | |
| 2,942,711 A | 6/1960 | Zindler | |
| 4,856,623 A * | 8/1989 | Romig, Jr. ................... | 188/180 |

FOREIGN PATENT DOCUMENTS

| | | |
|---|---|---|
| CN | 100339258 | 9/2007 |
| DE | 115895 | 2/1900 |
| DE | 839 528 | 5/1952 |
| DE | 2 342 336 | 3/1974 |
| DE | 29 05 711 | 8/1980 |
| DE | 92 04 156.6 U1 | 5/1993 |
| DE | 44 46 157 C2 | 7/1996 |
| DE | 197 33 706 C2 | 2/1998 |
| EP | 0 943 831 A2 | 9/1999 |

OTHER PUBLICATIONS

German Search Report dated Jun. 23, 2010 issued in German Patent Application No. 20 2009 005 935.9 (with translation).

* cited by examiner

*Primary Examiner* — Anna Momper
(74) *Attorney, Agent, or Firm* — Oliff PLC (57) ABSTRACT

The invention relates to a braking apparatus, in particular for implements of motor-driven tool units comprising an arm having at least one bearing disposed therein for rotatable mounting of an axle and comprising a flange fastened on the rotatably mounted axle, wherein the axle and/or the flange are drivable by means of a drive motor, wherein a first friction element is firmly connected on the arm and a second friction element is connected to the axle and/or to the flange, wherein the first and the second friction element come into frictional contact with one another or not depending on the action of centrifugal force on at least one flyweight.

2 Claims, 7 Drawing Sheets

BRAKING APPARATUS

CROSS-REFERENCE TO RELATED APPLICATION

This is a Division of application Ser. No. 12/662,537 filed Apr. 22, 2010. The disclosure of the prior application is hereby incorporated by reference herein in its entirety.

TECHNICAL FIELD

The invention relates to a braking apparatus, in particular for implements of motor-driven tool units according to the preamble of claim 1.

PRIOR ART

Motor-driven tool units are preferably driven either using an electric motor or using an internal combustion engine, an implement being driven by the drive motor of the tool unit provided in each case. For example, the tool unit is an angle grinder in which the cutting disk as implement is driven to fast revolutions by means of the drive motor. The implement can also, for example, be a saw or the like in which an implement such as a saw chain or similar is driven.

Along with performance aspects, a high safety margin in regard to the operator working with the tool unit is essential with such tool units. Due to the rapidly rotating or rapidly moving implements, there is usually an appreciable risk of injury if the tool units are operated inattentively or carelessly. It is therefore particularly essential that the implement is only driven in operating situations in which the operator wishes to work with the implement and in other operating situations the implement is as far as possible not driven, wherein the transition from the driven to the non-driven operating situation should be kept as short as possible when considered temporally to minimise or eliminate any risk of injury as far as possible.

Such implements are therefore usually coupled to the drive motor by means of a centrifugal clutch so that the clutch only engages when the rotational speed of the motor is high and then connects the drive motor with its output shaft to the input shaft of the implement. Only then is the implement driven. If the rotational speed of the drive motor is reduced again, the centrifugal clutch disengages and the drive motor is separated from the implement. Nevertheless, as a result of the afterrunning of the motor, the implement can usually still have a certain rotational speed so that the risk of injury arising therefrom is not avoided in this respect.

DE 44 46 157 C2 discloses an electrically driven implement such as in particular a circular saw, having a run-out brake, wherein a drivable first brake disk and a fixed brake disk are provided, which is released by action of centrifugal force on a radially spring-loaded ball.

DE 839 528 discloses an automatic brake for motors or machines in which an element migrating towards the outside under centrifugal force actuates the brake via levers.

An automatically operating braking device has also become known from DE 23 42 336.

The brakes in the prior art are found to be not particularly fast and therefore not sufficiently reliable. In addition, in some cases they are also very disadvantageous in regard to their installation space requirement so that they cannot be used in a modern product design.

DESCRIPTION OF THE INVENTION, OBJECT, SOLUTION, ADVANTAGES

It is the object of the invention to provide a braking apparatus which at least reduces the disadvantages of the prior art.

This is achieved with the features of claim 1 whereby a braking apparatus, in particular for implements of motor-driven tool units is provided, comprising an arm having at least one bearing disposed therein for rotatable mounting of an axle and comprising a flange fastened on the rotatably mounted axle, wherein the axle and/or the flange are drivable by means of a drive motor, wherein a first friction element is firmly connected on the arm and a second friction element is connected to the axle and/or to the flange, wherein the first and the second friction element come into frictional contact with one another or not depending on the action of centrifugal force on at least one flyweight.

In this case, in an advantageous exemplary embodiment it is expedient if the first friction element is a friction ring having an annular friction surface or a cylindrical friction ring having a cylindrical friction surface. The annular friction surface in this case points to the side and the cylindrical surface has an inner cylindrical surface as friction surface. In the configuration as an annular friction surface, the first and the second friction surface can be disposed oppositely and adjacent to one another so that the apparatus can be constructed to be radially small in this regard. In the configuration as a circular cylindrical friction surface, the first and the second friction surface can be disposed in a radially opposite manner so that the apparatus can be constructed to be axially small in this regard.

It is furthermore expedient if the second friction element is at least one element which is displaceable relative to the axle, which has a friction surface on one axial side.

According to an advantageous exemplary embodiment, it is expedient if the second friction element is a brake shoe which has an opening approximately centrally through which the axle can be guided.

In this context, it is advantageous if two brake shoes are provided as the second friction element which each have an opening approximately centrally through which the axle can be guided and the two friction surfaces of the brake shoes lie opposite to one another relative to the axle.

It is also expedient if the two brake shoes are clamped to one another under tension by means of at least one energy storage device such as a tension spring. In another exemplary embodiment it is also expedient if the two brake shoes are pressurised with respect to one another by means of at least one energy storage device such as by means of at least one compression spring.

In this context, it is particularly advantageous if respectively one end of the energy storage device is fastened to the respective brake shoe by means of at least one retaining element.

It is also expedient if the brake shoe is configured in such a manner that a flyweight lies opposite the friction surface in relation to the opening. For this purpose, the friction surface is attached to an arm which lies opposite a further arm which is also configured as an arm.

Furthermore, in another exemplary embodiment it is advantageous if the second friction element is a disk which has an opening approximately centrally through which the axle can be guided.

In this context it is expedient if the disk is axially displaceable by means of flyweights and balls accommodated in recesses in this respect.

BRIEF DESCRIPTION OF THE DRAWINGS

The invention is explained in detail hereinafter on the basis of an exemplary embodiment by reference to the drawings. In the figures.

PREFERRED EMBODIMENT OF THE INVENTION

Figure 1:
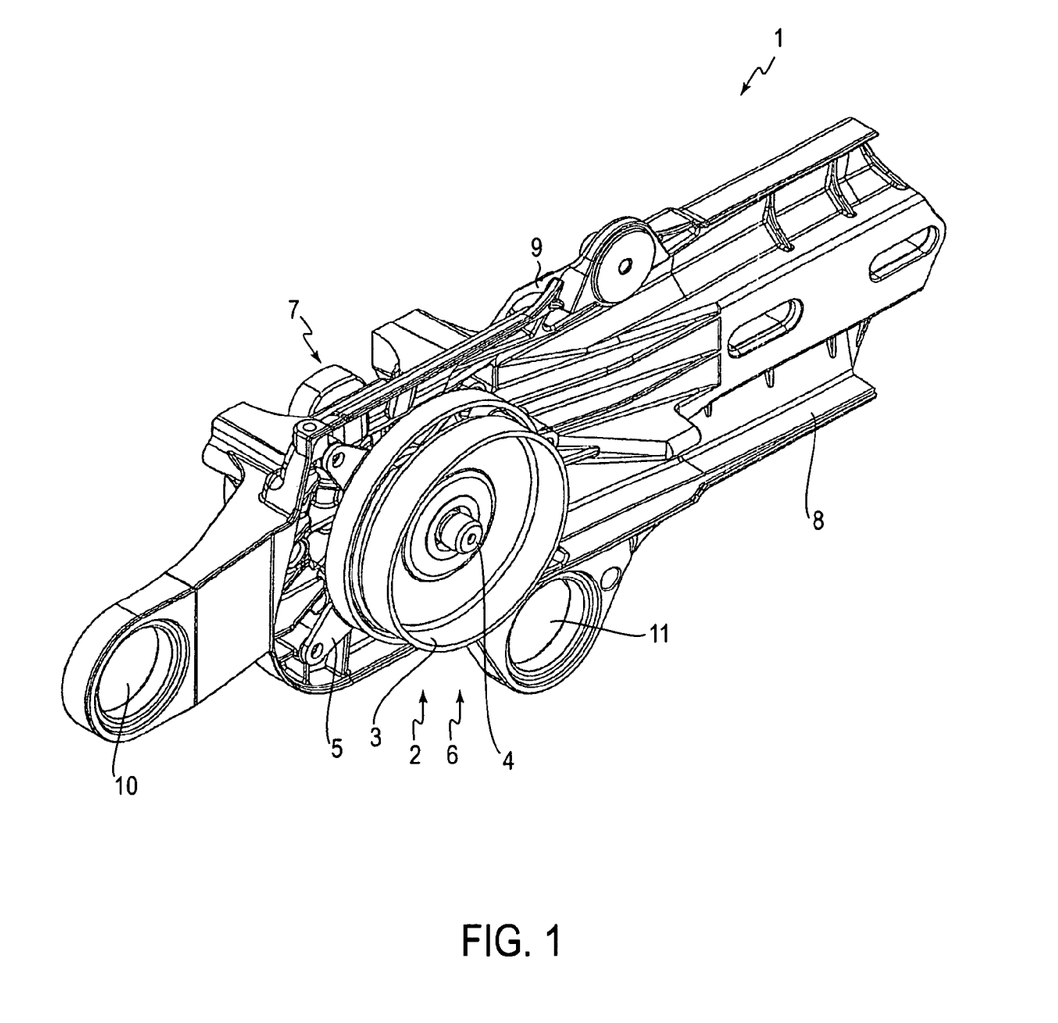
FIG. 1 shows a view of an arm of a tool unit having a rotatable flange with braking apparatus.

FIG. 1 shows an arm 2 of a motor-drive tool unit 1, wherein the motor of the tool unit with its V-belt typically provided for driving the implement itself is not shown. Provided at the front end of the arm 2 is a braking apparatus 6 which shows a rotatably mounted flange 3 with a friction ring 5. The flange 3 is rotatably mounted by means of an axle 4 mounted with the aid of at least one bearing 7. Disposed radially inside the friction ring 5 is at least one braking element or a plurality of, such as for example two, braking elements which serve to brake the flange firmly with respect to the friction ring.

The arm 2 is advantageously configured as a moulded part which can be formed from plastic or as a sheet metal part. The arm is preferably configured to be at least two-part, so that it is formed, for example, from two shells 8, 9 which are joined together along the length of the arm.

Provided at the front end of the arm 2 are two circular openings 10, 11 which serve for receiving or for holding.

Figure 2:
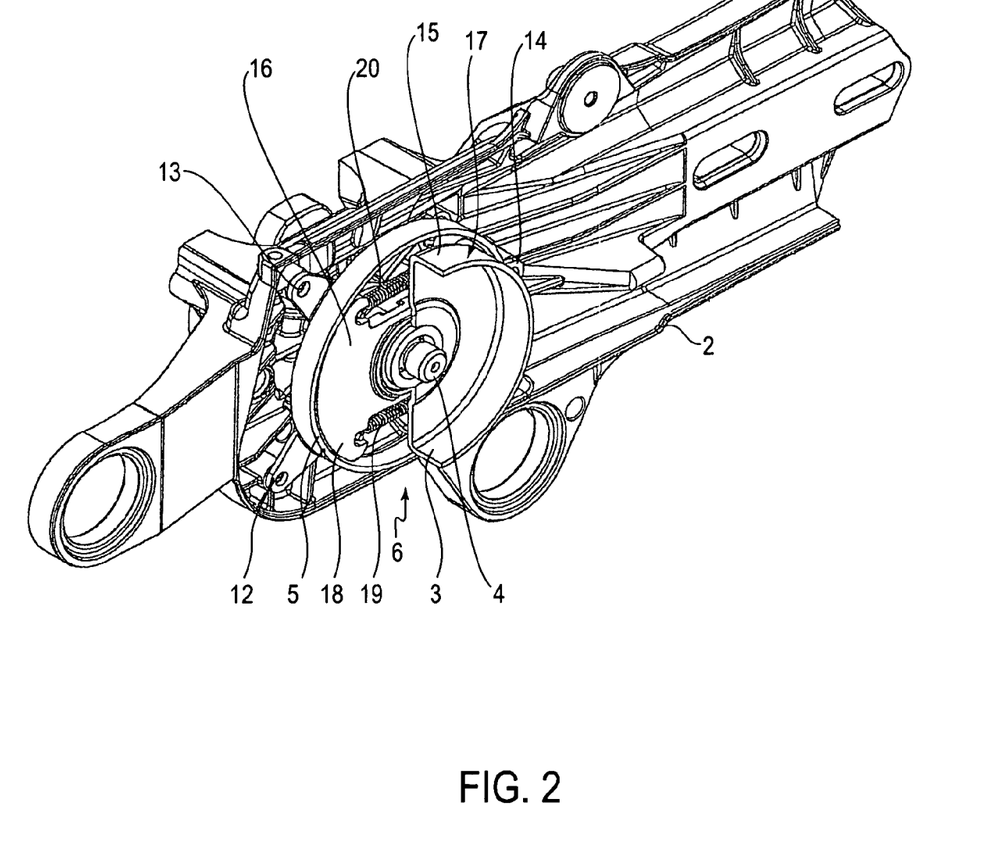
FIG. 2 shows a view of an arm of a tool unit having a rotatable flange with braking apparatus.

FIG. 2 shows schematically an arrangement of 6, wherein the friction ring 5 is a circular cylindrical section which is fastened to the arm 2 by means of lugs 12, 13, 14.

Two oppositely disposed brake shoes 15, 16 located opposite to one another relative to the axle 4 are provided radially inside the friction ring 5. The two brake shoes 15, 16 are configured in such a manner that they have a friction surface 17 on one side and a flyweight 18 on the opposite side. Only the friction surface of the front brake shoe can be identified in FIG. 2, the friction surface 17 of the rear brake shoe being concealed behind the flyweight 18 of the front brake shoe.

The brake shoes 15, 16 are laterally displaceable relative to the axle 4 so that in normal operation the brake shoes 15, 16 with friction surface 17 abut frictionally and therefore also brakingly against the friction ring 5. The two opposing brake shoes 15, 16 are clamped with respect to one another by means of at least one energy storage device 19, 20 or by means of at least one spring or another type of elastic element so that the two flyweights 18 of the two brake shoes 15, 16 are acted upon towards one another and hence the two friction surfaces 17 abut against the friction ring 5. If the flange 3 is turned with the brake shoe rotatingly connected thereto, as a result of the centrifugal force the two flyweights 18 are urged radially outwards against the spring force and the friction surface 17 is thus raised from the friction ring 5 and releases the brake and the flange 3 can rotate freely. The springs 19, 20 disposed with respect to the axle 4 are tensionally pre-stressed.

As can be seen in FIG. 2, the brake shoes 15, 16 are configured in such a manner that they have a central opening through which the axle 4 engages. The brake shoes are radially displaceable in the region of the opening.

Figure 3:
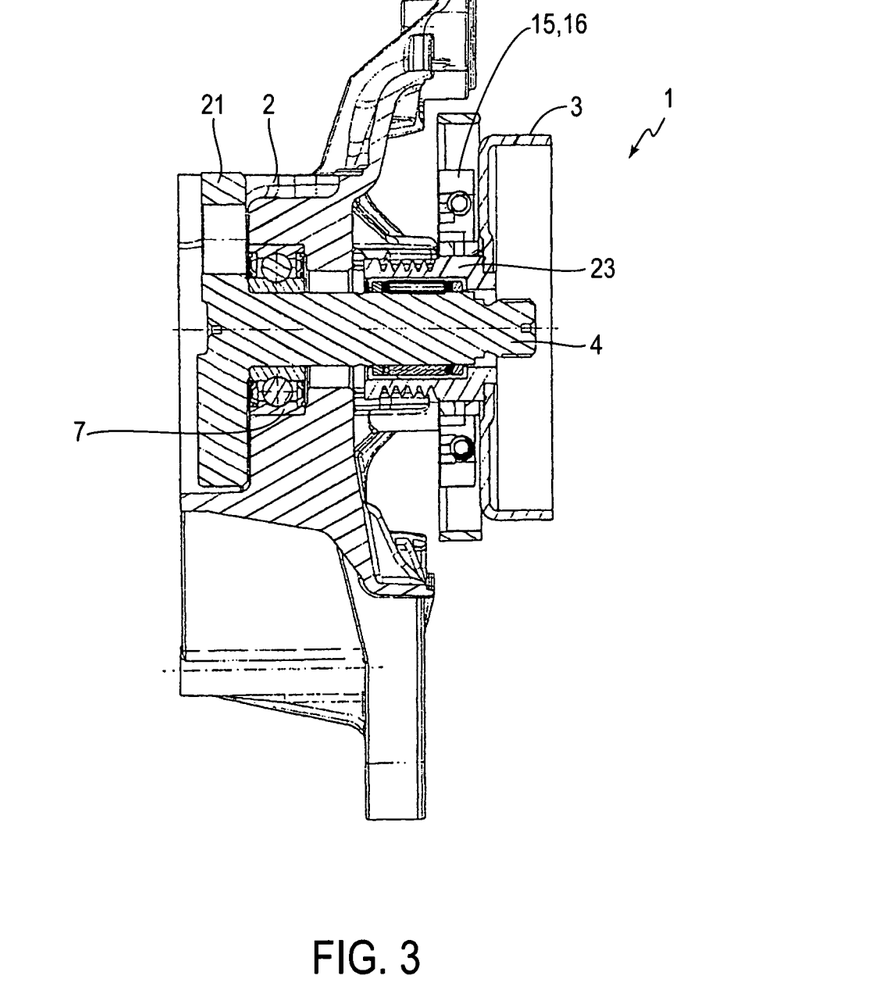
FIG. 3 shows a section through an arm of a tool unit having a rotatable flange with braking apparatus.

FIG. 3 shows a braking apparatus 1 according to the invention in section. The flange 3 which is accommodated mounted on the axle 4 can be identified. In this case, the axle 4 is mounted rotatably in the arm 2 by means of the bearing 7. The bearing is configured as a single-row ball bearing, wherein it can also be configured as a multi-row ball bearing, a tapered roller bearing or needle roller bearing or as a friction bearing. A flywheel 21 is disposed on the side of the bearing 7 opposite to the flange.

The flange 3 and the braking apparatus with the brake shoes 15, 16 are disposed on the other side of the bearing 7. Disposed between the braking apparatus and the bearing 7 is a pulley 23 by which means the shaft 4 and the flange 3 can be driven by means of a belt drive.

Figure 4:
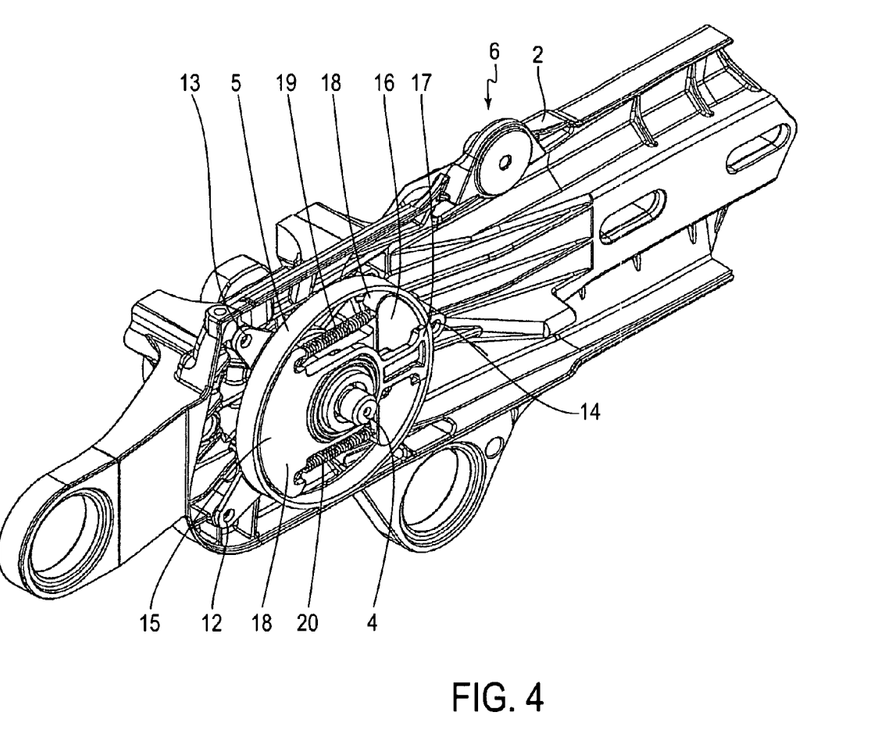
FIG. 4 shows a view of a braking apparatus.

FIG. 4 shows schematically an arrangement of the braking apparatus 6, wherein the friction ring 5 is a circular cylindrical section which is fastened to the arm 2 by means of lugs 12, 13, 14.

Two oppositely disposed brake shoes 15, 16 located opposite to one another relative to the axle 4 are provided radially inside the friction ring 5. The two brake shoes 15, 16 are configured in such a manner that they have a friction surface 17 on one side and a flyweight 18 on the opposite side. Only the friction surface 17 of the front brake shoe 15 can be identified in FIG. 4, the friction surface 17 of the rear brake shoe 16 being concealed behind the flyweight 18 of the front brake shoe 15.

The brake shoes 15, 16 are laterally displaceable relative to the axle 4 so that in normal operation the brake shoes 15, 16 with friction surface 17 abut frictionally and therefore also brakingly against the friction ring 5. The two opposing brake shoes 15, 16 are clamped with respect to one another by means of at least one energy storage device 19, 20 or by means of at least one spring or another type of elastic element so that the two flyweights 18 of the two brake shoes 15, 16 are acted upon towards one another and hence the two friction surfaces 17 abut against the friction ring 5. If the flange 3 is turned with the brake shoe rotatingly connected thereto, as a result of the centrifugal force $F_{centrif}$ the two flyweights 18 are urged radially outwards against the spring force $F_{spring}$ and the friction surface 17 is thus raised from the friction ring 5 and releases the brake and the flange 3 can rotate freely. The springs 19, 20 disposed with respect to the axle 4 are tensionally pre-stressed.

As can be seen in FIG. 4, the brake shoes 15, 16 are configured in such a manner that they have a central opening through which the axle 4 engages. The brake shoes are radially displaceable in the region of the opening. The friction surface 17 projects radially from the central region and has an arcuate end region which serves as a friction surface.

It is particularly advantageous if a belt drive is provided by which means the pulley 23 and therefore the axle and the flange are driven by means of a belt not shown.

The brake shoes have the form of a crank web which are tensioned towards one another by means of one or two springs so that the friction surfaces thereby abut against the friction ring and hold frictionally tightly. At higher rotational speeds the friction surface is released from the friction ring and can turn freely.

In modern motors as a result of the low friction power, it is possible that the residual torque of the motor even turns when idling. The braking apparatus according to FIGS. 1 to 4 reliably prevents this. The braking apparatus holds the implement and the flange connected thereto in a frictionally tight manner and the brake is only released when a predefinable limiting rotational speed of about 1500 to 2000 rpm is exceeded.

Figure 5:
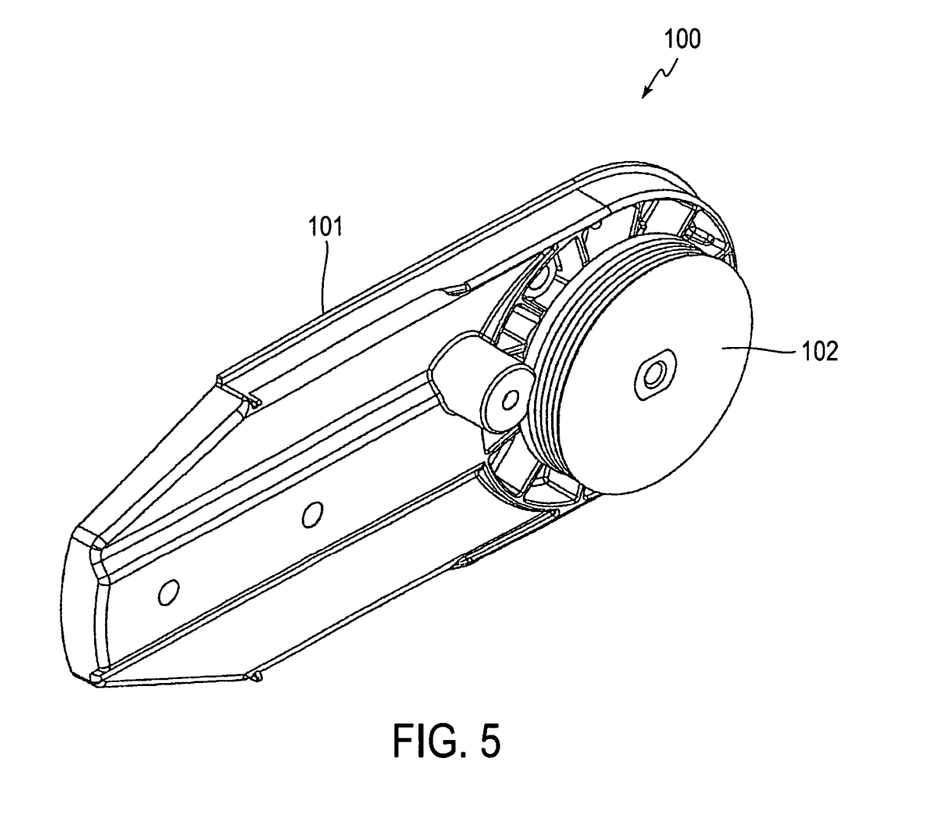
FIG. 5 shows a view of an arm of a tool unit having a rotatable flange with braking apparatus.

FIG. 5 shows schematically another embodiment of a braking apparatus 100 according to the invention comprising an arm 101 and a rotatable flange 102.

Provided radially inside the flange 102 and axially between the flange 102 and the arm 101 is a braking apparatus which serves to firmly brake or release the flange.

Figure 6:
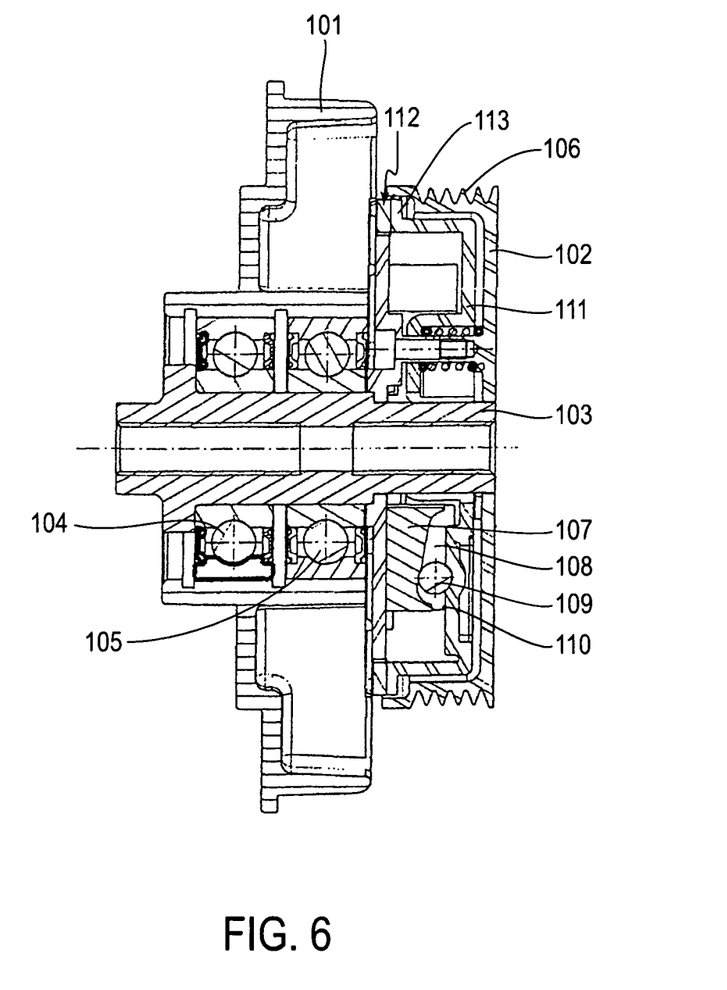
FIG. 6 shows a section through an arm of a tool unit having a rotatable flange with braking apparatus.

FIG. 6 shows the apparatus from FIG. 5 in section. The flange 102 is fastened on an axle 103, which is preferably configured to be hollow, and is thus rotatably mounted in the arm 101 by means of the bearings 104, 105. The flange 102 has a pulley 106 radially outwards which is configured in one piece with the flange 102. A mechanism for braking is provided radially inside the pulley 106 and radially outside the axle 103. Provided for this purpose are radially movable weights 107 which have a recess 108 within which balls 109 or cylindrical elements are accommodated, said balls or cylindrical elements resting axially outwards on a wall element 110. The wall 110 is a part of a disk 111 which is disposed around the axle 103 and which is bent radially outwards, see 112 and abuts or can abut there against a friction surface 113.

Figure 7:
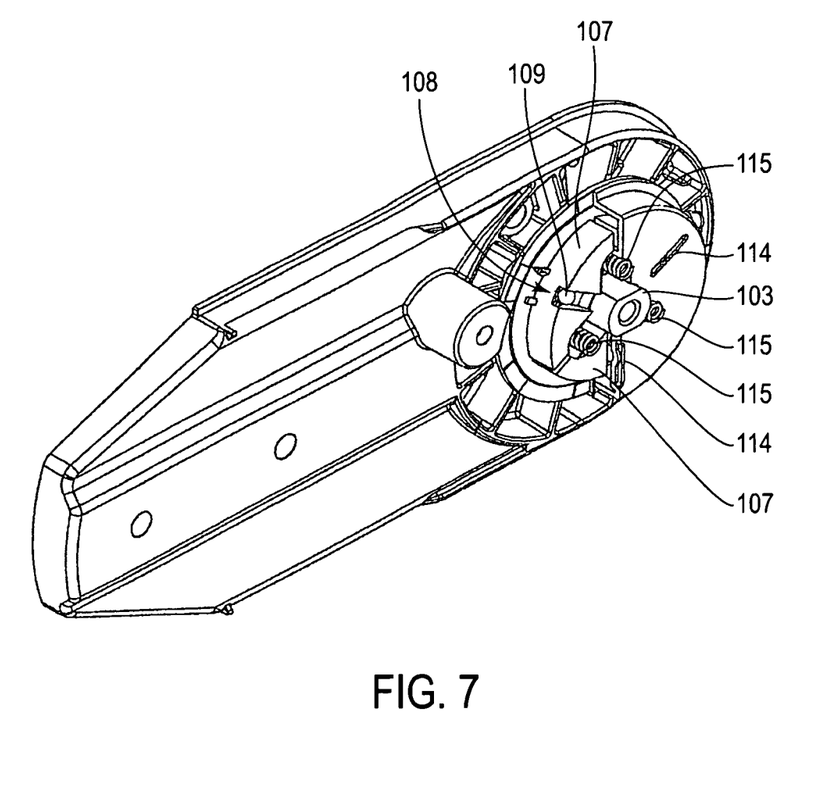
FIG. 7 shows a view of a braking apparatus.

FIG. 7 shows three centrifugal weights 107 which are arranged in the manner of a circular segment around the axle 103. The weights have a receiving space or recesses 108 which receive the balls 109. A retaining element 114 acts on the balls 109 in each case, holding the balls 109 in position relative to the weight, so that the balls 109 migrate radially outwards with the weight under the action of centrifugal force or stay there without the influence of centrifugal force.

Pre-tensioning springs 115 are also provided, which press the disk 111 onto the friction ring or onto the friction surface 113 so that the frictional contact is provided accordingly when there is little or no centrifugal force.

If a rotational speed is now applied, a centrifugal force acts on the weights 107 and the balls 109 are moved radially outwards with the flyweights 107, these moving in the corresponding recess 108 in the axial direction.

In the state with low rotational speeds or at a standstill, the radially outwardly located part of the disk abuts against the friction surface and thus brakes the flange. At high rotational speeds the friction surface is released and the flange can rotate freely.

REFERENCE LIST

1 Tool unit
2 Arm
3 Flange
4 Axle
5 Friction ring
6 Braking apparatus
7 Bearing
8 Shell
9 Shell
10 Opening
11 Opening
12 Lug
13 Lug
14 Lug
15 Brake shoe
16 Brake shoe
17 Friction surface
18 Flyweight
19 Energy storage device, spring
20 Energy storage device, spring
21 Flywheel
22 Opening
23 Pulley
100 Braking apparatus
101 Arm
102 Flange
103 Axle
104 Bearing
105 Bearing
106 Pulley
107 Weight, centrifugal weight
108 Recess
109 Ball
110 Wall
111 Disk
112 Bent region of disk
113 Friction surface
114 Retaining element
115 Pre-tensioning spring

The invention claimed is:

1. A braking apparatus for implements of motor-driven tool units, the braking apparatus comprising:
an arm having at least one bearing disposed therein for rotatable mounting of an axle; and
a flange fastened on the rotatably mounted axle, the axle and/or the flange being drivable by means of a drive motor, wherein
a first friction element is firmly connected on the arm and a second friction element is connected to the axle and/or to the flange establishing an integral rotation of the second friction element and the axle and/or the flange,
the first friction element and the second friction element come into frictional contact with one another in a state where the rotatable axle rotates at low rotational speeds or is at a standstill, and not come into frictional contact with one another in a state where the rotatable axle rotates at high rotational speeds, depending on the action of centrifugal force on at least one flyweight,
the second friction element is at least one element which is displaceable relative to the axle, which has a friction surface on one side, and
the second friction element is a disk which has an opening approximately centrally through which the axle can be guided.

2. The braking apparatus according to claim 1, wherein the disk is axially displaceable by means of flyweights and balls accommodated in recesses in this respect.

* * * * *